United States Patent [19]
Yamada et al.

[11] Patent Number: 5,842,129
[45] Date of Patent: Nov. 24, 1998

[54] PORTABLE RADIO TELEPHONE EQUIPMENT USED FOR CMTS/MCS IN COMMON

[75] Inventors: Jun Yamada; Masaki Terashima; Kenichi Ooyama, all of Yokohama, Japan

[73] Assignee: Matsushita Electric Industrial Co., Ltd., Osaka, Japan

[21] Appl. No.: 389,687

[22] Filed: Feb. 16, 1995

Related U.S. Application Data

[63] Continuation of Ser. No. 956,337, Oct. 5, 1992, abandoned, and a continuation-in-part of Ser. No. 209,594, Mar. 10, 1994, which is a continuation of Ser. No. 796,808, Nov. 25, 1991.

[30] Foreign Application Priority Data

Oct. 11, 1991 [JP] Japan .................................. 3-263482

[51] Int. Cl.$^6$ .................................................. H04Q 7/20
[52] U.S. Cl. ........................................... 455/444; 455/450
[58] Field of Search .................... 455/434, 440, 455/444, 450, 515, 443

[56] References Cited

U.S. PATENT DOCUMENTS

| | | | |
|---|---|---|---|
| 4,768,220 | 8/1988 | Yoshihara et al. | 379/61 |
| 4,776,001 | 10/1988 | Murata | 379/62 |
| 4,790,000 | 12/1988 | Kinoshita | 379/61 |
| 4,792,984 | 12/1988 | Matsuo | 379/59 |
| 4,850,033 | 7/1989 | Eizenhofer et al. | 455/33.1 |
| 4,989,230 | 1/1991 | Gillig et al. | 379/59 |
| 5,040,238 | 8/1991 | Comroe et al. | 455/33 |
| 5,056,109 | 10/1991 | Gilhousen et al. | 455/33.1 |
| 5,067,147 | 11/1991 | Lee | 379/59 |
| 5,095,529 | 3/1992 | Comroe | 379/60 |
| 5,101,500 | 3/1992 | Marui | 455/33.1 |
| 5,127,042 | 6/1992 | Gillig et al. | 379/59 |
| 5,152,002 | 9/1992 | Leslie | 379/59 |
| 5,179,720 | 1/1993 | Grube | 455/16 |
| 5,193,101 | 3/1993 | McDonald et al. | 379/60 |
| 5,193,109 | 3/1993 | Chien-Yeh Lee | 379/60 |
| 5,197,093 | 3/1993 | Knuth et al. | 379/61 |

(List continued on next page.)

FOREIGN PATENT DOCUMENTS

| | | |
|---|---|---|
| 0418096 | 3/1991 | European Pat. Off. . |
| 58-151136 | 9/1983 | Japan . |
| 01309527 | 12/1989 | Japan . |
| 01309528 | 12/1989 | Japan . |
| 02126736 | 5/1990 | Japan . |
| 02193425 | 7/1990 | Japan . |
| 2234649 | 2/1991 | United Kingdom . |
| 2242806 | 10/1991 | United Kingdom . |
| 2252699 | 8/1992 | United Kingdom . |
| 2253968 | 9/1992 | United Kingdom . |
| 2255474 | 11/1992 | United Kingdom . |
| 2255476 | 11/1992 | United Kingdom . |
| WO86/06915 | 11/1986 | WIPO . |

*Primary Examiner*—Vijay Shankar
*Attorney, Agent, or Firm*—Amster, Rothstein & Ebenstein

[57] ABSTRACT

A portable radio telephone equipment in which both the frequency and equipment can be used in common to CMTS and MCS so that the efficiency for use both for the frequency and equipment can be improved. This equipment monitors the control channel number of CMTS through a radio transmission section and a control section for common use to CMTS and MCS and answers a call from a base station or performs transmission. On the other hand, this equipment selectively receives the control channel number of MCS and answers a call from a base station or performs transmission. Either one of these actions is automatically selected on the basis of the reception level and system ID of the control channel number. At this time, standby-state reception is performed on the judgment as to which one of CMTS and MCS is to be accessed, by automatically detecting the positional condition of the equipment in use. When the equipment is moved to a different area in CMTS or MCS, either one of CMTS and MCS is automatically accessed after position registration.

7 Claims, 2 Drawing Sheets

U.S. PATENT DOCUMENTS

| | | | |
|---|---|---|---|
| 5,203,015 | 4/1993 | George | 455/367 |
| 5,212,805 | 5/1993 | Comroe et al. | 455/33.1 |
| 5,237,603 | 8/1993 | Yamagata et al. | 379/61 |
| 5,257,400 | 10/1993 | Yoshida | 379/63 |
| 5,257,401 | 10/1993 | Dahlin et al. | 379/60 |
| 5,260,988 | 11/1993 | Schellinger et al. | 379/59 |
| 5,261,117 | 11/1993 | Olson | 455/56.1 |
| 5,276,730 | 1/1994 | Cimini, Jr. et al. | 379/60 |
| 5,303,287 | 4/1994 | Laborde | 379/59 |
| 5,353,331 | 10/1994 | Emery et al. | 379/60 |
| 5,418,839 | 5/1995 | Knuth et al. | 455/464 |
| 5,504,803 | 4/1996 | Yamada | 379/59 |

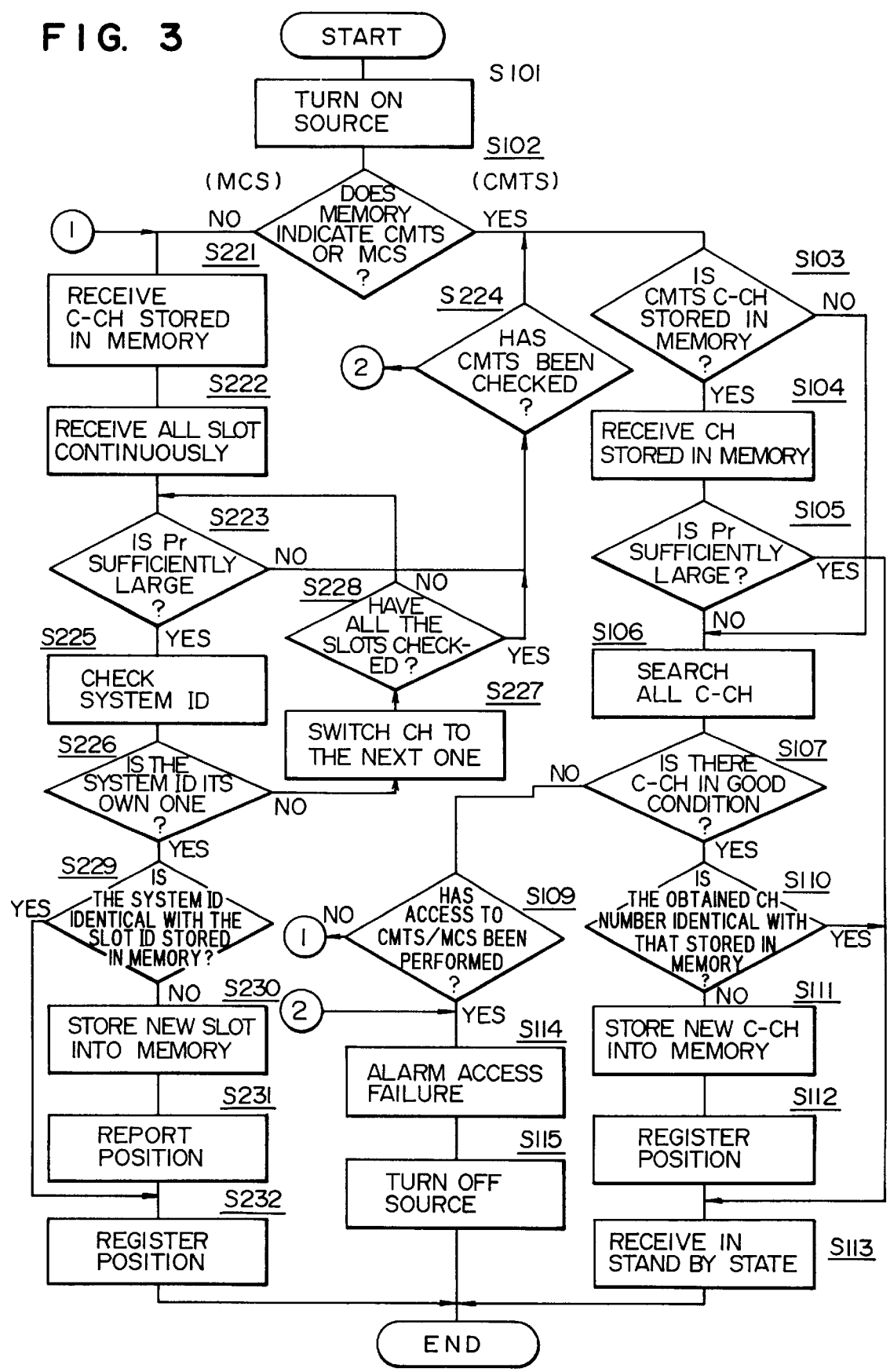

PORTABLE RADIO TELEPHONE EQUIPMENT USED FOR CMTS/MCS IN COMMON

This is a continuation of application Ser. No. 07/956,337 filed on Oct. 5, 1992, now abandoned.

This application is a continuation-in-part of U.S. Pat. application Ser. No. 08/209,594, filed Mar. 10, 1994, entitled "Apparatus And Method For Providing A Microzone Communication System With A Cellular Telephone System" which is a continuation of Patent Application Ser. No. 07/796,808, originally entitled "Mobile Communication System" and filed on Nov. 25, 1991.

BACKGROUND OF THE INVENTION

The present invention relates to a portable radio telephone equipment for common use for a cellular mobile telephone system (CMTS) and a micro cellular system (MCS), in which the frequency can be used in common so that either one of CMTS and MCS can be accessed automatically.

Heretofore, the cellular mobile telephone system (hereinafter also referred to as CMTS) has been used as a mobile communication system. On the other hand, the micro cellular system (hereinafter also referred to as MCS) has been used as a radio communication system using feeble radio wave in a limited range such as the inside of a building. The CMTS and the MCS respectively use frequency bands provided separately from each other.

SUMMARY OF THE INVENTION

In the CMTS, the service area is restricted by using a directional antenna. In this case, the frequency band used for the CMTS can be used for the MCS in a specific place such as the inside of a building located in an area of small electric field intensity outside the service area (beam area) restricted by the directional antenna. In the present state, however, the frequency band used for the CMTS is not used for the MCS, that is, effective use of frequency is not made. Furthermore, there has been no precedent for use of frequency in common to the CMTS and the MCS and for use of a portable radio telephone equipment in common. Accordingly, there arises a disadvantage in that efficiency both in use of radio wave and in use of equipment is poor.

The present invention has as its object the provision of an excellent CMTS/MCS double-use portable radio telephone equipment which can be used for CMTS and MCS in common in the double sense of frequency and equipment to improve efficiency both in use of frequency and in use of equipment to thereby eliminate the aforementioned disadvantage in the prior art.

In addressing the foregoing object, the CMTS/MCS double-use portable radio telephone equipment comprises: CMTS response transmission means for answering a call from a CMTS base station or for performing transmission through monitoring control channels of CMTS; MCS response transmission means for answering a call from an MCS base station or for performing transmission through selectively receiving control channels of MCS; and selection means for automatically selecting either one of the CMTS response transmission means and the MCS response transmission means on the basis of the reception level and identification number of the control channels.

According to the CMTS/MCS double-use portable radio telephone equipment, the positional condition of the equipment in use is automatically detected so that standby-state reception is performed on the judgment as to whether CMTS or MCS is to be accessed. Furthermore, when the equipment is moved to a different area in CMTS or MCS, either one of CMTS and MCS is automatically accessed after position registration. As a result, both the frequency and equipment can be used in common to CMTS and MCS, so that the efficiency both in use of frequency and in use of equipment can be improved.

BRIEF DESCRIPTION OF THE DRAWINGS

FIG. 3 is a flow chart showing a series of procedure for the operation of the equipment in the embodiment depicted in FIG. 2.

DESCRIPTION OF PREFERRED EMBODIMENT

An embodiment of the present invention as to the CMTS/MCS double-use portable radio telephone equipment will be described below with reference to the drawings.

Figure 1:
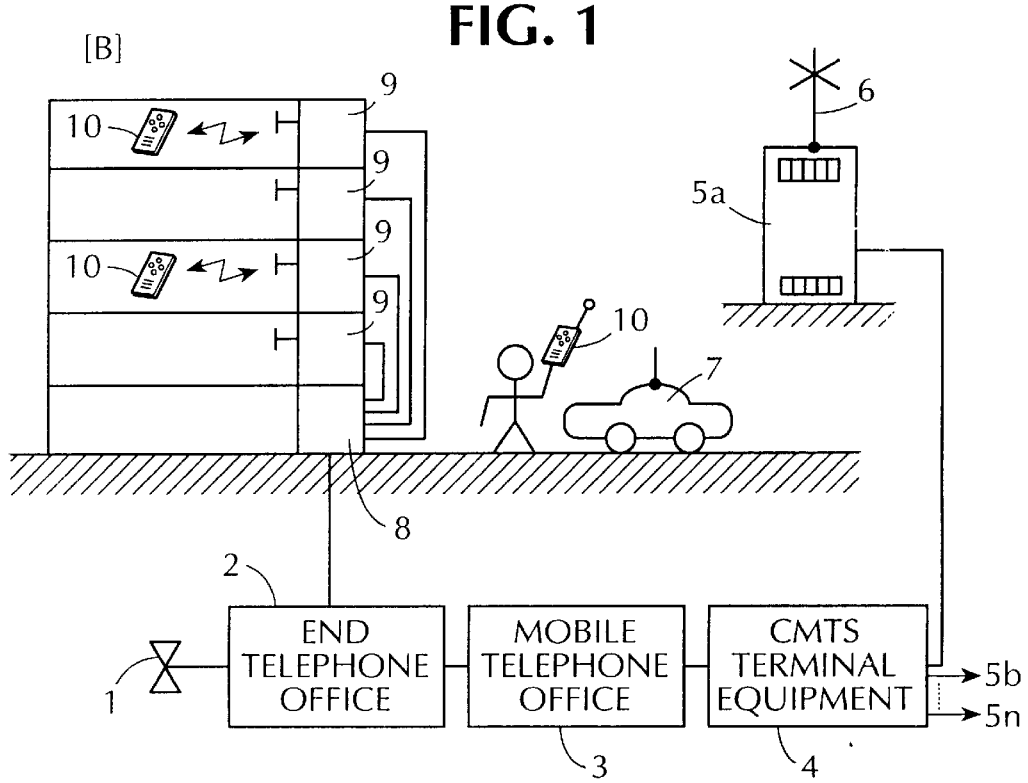
FIG. 1 is a diagram showing the general configuration of the CMTS and MCS using a CMTS/MCS double-use portable radio telephone equipment according to the present invention.

FIG. 1 shows the configuration of the CMTS and MCS. In FIG. 1, the reference numeral 1 designates a wire telephone equipment, 2 an end telephone office (E.O), 3 a mobile telephone office, 4 a CMTS terminal equipment, 5 (5a, 5b to 5n) radio base stations, 6 a base station antenna, 7 a mobile telephone equipment, 8 an MCS terminal equipment in a building or the like, 9 an MCS base station, and 10 a CMTS/MCS double-use portable radio telephone equipment.

Figure 2:
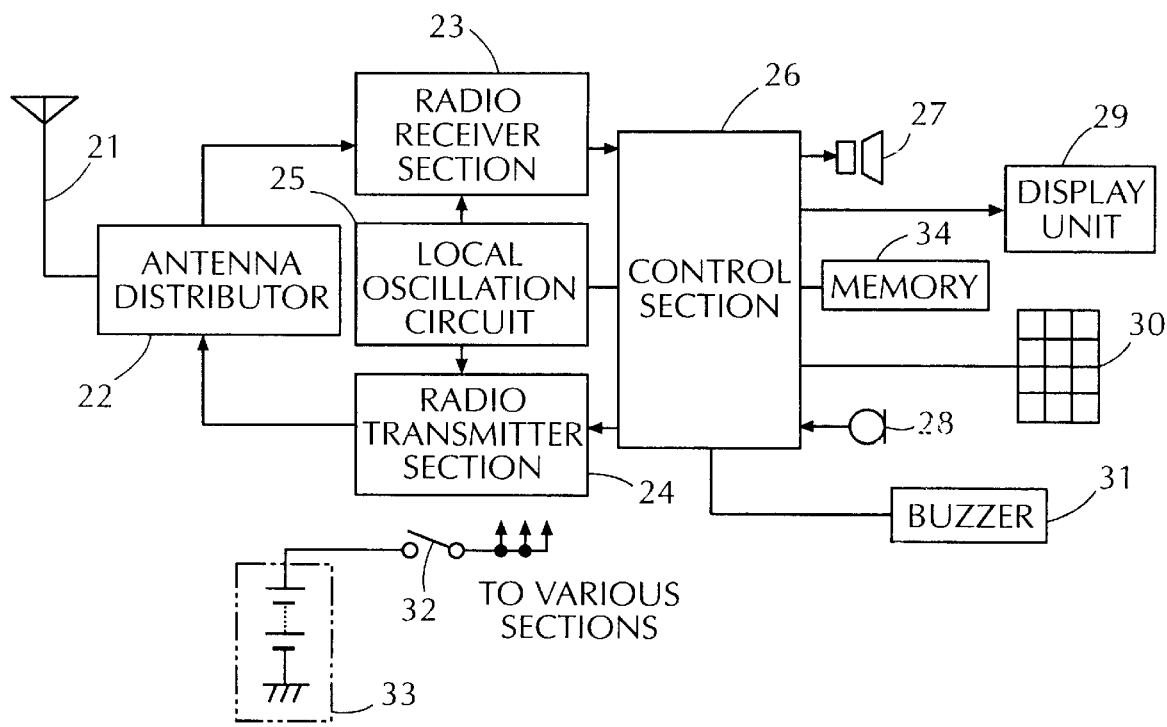
FIG. 2 is a block diagram showing the configuration of the CMTS/MCS double-use portable radio telephone equipment as an embodiment of the present invention.

FIG. 2 shows the configuration of the CMTS/MCS double-use portable telephone equipment 10. In FIG. 2, the reference numeral 21 designates an antenna, 22 an antenna distributor for transmission and reception, 23 a radio receiver section used in common to the CMTS and MCS, 24 a radio transmitter section used in common to the CMTS and MCS, and 25 a local oscillation circuit constituted by a frequency synthesizer for outputting an oscillation signal for frequency conversion in the radio receiver section 23 and the radio transmitter section 24. The reference numeral 26 designates a control section for performing control for communication connection to the CMTS or MCS and so on, the control section 26 being provided with a memory 34 in the inside or outside thereof. The reference numeral 27 designates a telephone receiver, 28 a telephone transmitter, 29 a display unit for displaying a dial number and so on, 30 a keyboard section for entry of a telephone number and so on, 31 a buzzer for producing a sound as a call signal, 32 an electric source switch, and 33 a battery pack. The memory 34 is constituted by an ROM (PROM) and an RAM.

In the following, the operation of the CMTS and MCS will be described. The radio base stations 5a, 5b to 5n for the CMTS cover a service area within a radius of 3 km. The service area is divided into 120° sector zones by directional antennas thereof. Because the MCS is adapted for radio communication between floors in the inside of a building [B], a channel (CH) allowed to be used for the MCS is selected from a CMTS frequency band.

The CMTS/MCS double-use portable radio telephone equipment 10 serves as a mobile telephone equipment 7 in FIG. 1 in the case of use of the CMTS and also as an MCS telephone equipment. The transmission electric power of the CMTS/MCS double-use portable radio telephone equipment 10 is set to be not larger than about 100 mW. That is, in the case where the CMTS/MCS double-use portable radio telephone equipment 10 is used in the inside of the building [B], not only consideration of avoiding interference with the CMTS is provided by the setting of the transmission electric power but consideration of avoiding influence of the CMTS is provided by setting the 120° sector zone of the directional antenna out of the service area in the site of the CMTS.

In the following, the operation of the CMTS/MCS double-use portable radio telephone equipment 10 shown in FIG. 2 will be described below.

FIG. 3 shows a flow of the operation. In a step 101, the electric source switch 32 is turned on. When, for example, the radio receiver section 23 of the CMTS/MCS double-use portable radio telephone equipment 10 is started, the fact that which one of the CMTS and MCS had been operating just before the last turning-off of the electric source switch 32 has been stored in the memory 34 in the control section 26. In a step 102, access to the storage in the memory 34 is made under the control of the control section 26 so as to judge whether the storage in the memory 34 indicates the CMTS or not, and if the result of the judgment in the step 102 is "Yes", a judgment is made in a step 103 as to whether a C-channel for the CMTS is stored in the memory 34 or not. When the result of judgment in the step 103 is "Yes", the channel stored in the memory 34 is received in a step 104. In a step 105, a judgment is made as to whether reception electric power (reception electric field intensity) Pr from the radio receiver section 23 is sufficiently large or not. When the reception electric power Pr is sufficiently large, the situation of the routine goes to a step 113 in which the radio receiver section 23 is operated to be in a standby reception state under the control of the control section 26, and the series of procedure to this point is terminated.

In the case where the judgment in the step 103 proves that there is no C-channel stored in the memory 34 or in the case where the result of the judgment in the step 103 is "Yes" but the reception electric power Pr of the channel stored in the memory 34 is not sufficiently large, all the C-channels in each zone for the CMTS are searched under the control of the control section 26 in a step 106 so that the reception electric power Pr of each C-channel is stored together with the channel number thereof. In a step 107, a judgment is made as to whether there is any C-channel being in good condition or not. When the result of the judgment in the step 107 is "Yes", a judgment is made in a step 110 as to whether the channel number of the thus obtained channel is identical to the channel number stored in the memory. When the result of the judgment is "Yes", the situation of the routine goes to the step 113 even though the reception electric power Pr is insufficient. In the step 113, the radio receiver section 23 is operated to be in a standby reception state, and the series of procedure to this point is terminated.

When the result of the judgment in the step 107 proves that there is no channel in good condition, a judgment is made in a step 109 as to whether access to MCS has been performed or not. When the result of the judgment in the step 109 is "No", the situation of the routine goes to access to the MCS. When the result of the judgment in the step 109 is "Yes", on the contrary, an alarm for access failure is generated from the buzzer 31 under the control of the control section 26 in a step 114. Here, the user switches turn off the electric source, so that the series of procedure to this point is terminated.

Circuit connection may be cut off automatically so that a retrial can be made in predetermined timing. When the result of the judgment in the step 107 is "Yes", a judgment is made in a step 110 again as to whether the channel number of the obtained channel is identical with the channel number stored in the memory 34. When the result of the judgment in the step 110 is "No", that is, when the channel number is not identical with the channel number stored in the memory 34, a new C-channel number is stored in the memory under the control of the control section 26 in a step 111. Then, in a step 112, position registration to report the position of the equipment by signal transmission is performed. Then, in a step 113, the radio receiver section 23 is operated to be in a standby reception state and the series of procedure to this point is terminated. When the result of the judgment in the step 107 is "No", that is, when there is no channel in good condition, the C-channel allocated to the MCS is received in a step 221. In a step 222, all slots are continuously received. In a step 223, a judgment is made as to whether there is any slot having sufficiently large reception electric power Pr. When the judgment proves that there is no slot having sufficiently large reception power Pr, the situation of the routine goes to a step 224 in which a judgment is made as to whether the CMTS has been checked or not. When the result of the judgment is "Yes", that is, when the CMTS has been checked n times, an alarm for access failure is generated from the buzzer 31 under the control of the control unit 26 in a step 114. When the result of the judgment in the step 223 is "Yes", the system ID (identification number) of the CMTS or MCS is checked in a step 225 and then a judgment is made in a step 226 as to whether the checked system ID is the ID of its own system or not. When the result of the judgment is "No", the channel number is changed to the next one in a step 227 to detect the system ID of a slot having next-ranking reception electric power Pr. In a step 228, a judgment is made as to whether all the slots have been already monitored or not. When the result of the judgment in the step 228 is "Yes", the situation of the routine goes to a step 224 in which access to the CMTS is performed. When the result of the judgment in the step 226 is "Yes", the situation of the routine goes to a step 229 in which a judgment is made as to whether the system ID is identical with the slot ID stored in the memory 34. When the result of the judgment is "No", a new slot is stored in the memory 34 in a step 230 and then the position of the equipment is reported in a step 231. After position registration, in a step 232, the radio receiver section is operated to be in a standby reception state for the MCS. Thus, the series of procedure to this point is terminated.

As described above, which one of the CMTS and MCS is to be accessed is judged on the basis of the reception level and the system ID of the control channel number. When the result of the judgment is not identical with the storage in the memory, the storage in the memory is rewritten so that changeover between the CMTS and MCS is performed automatically. This changeover is reported to the user.

As is obvious from above description, in the CMTS/MCS double-use portable radio telephone equipment according to the invention, standby-state reception is performed on the judgment as to which one of the CMTS and MCS is to be accessed, by automatically detecting the positional condition of the equipment in use. When the equipment is moved to a different area in the CMTS or MCS, either one of the CMTS and MCS is automatically accessed after position registration. Accordingly, there arises an effect in that both the frequency and equipment can be used in common to the CMTS and MCS to improve the efficiency in use both for the frequency and for the equipment.

What is claimed is:

1. A method for automatically selecting the operating mode of a radio telephone capable of operating on a cellular mobile telephone system (CMTS) and on a microcellular system (MCS) which utilizes the same channels as said CMTS, comprising the steps of:

said radio telephone retrieving information stored in a memory is said radio telephone identifying at least one CMTS or MCS control channel previously accessed by said radio telephone;

said radio telephone assessing the received power to determine availability of said at least one CMTS or MCS control channel; and said radio telephone setting itself to operate on either the CMTS or MCS in accordance with said availability, wherein, if the received power of said at least one CMTS or MCS control channel is not adequate, said radio telephone automatically selects either a CMTS operating mode or MCS operating mode in accordance with the steps of:

scanning the CMTS channels to determine the availability of at least one CMTS or MCS control channel at the location of said radio telephone;

storing information obtained as a result of said scanning in said memory; and selecting either a CMTS operating mode or a MCS operating mode in accordance with said information stored in said memory.

2. The method of claim 1 wherein the information stored as a result of said scanning includes the channel number and received power of said at least one CMTS or MCS control channel.

3. The method of claim 1 wherein the information stored as a result of said scanning includes the system identification associated with said at least one CMTS or MCS control channel.

4. A portable radio telephone for use either in a cellular mobile telephone system (CMTS) to which access is gained by using one of a plurality of CMTS control channels allotted thereto or in a microcellular system (MCS) which operates in the same frequency band and within an operating area of said CMTS to which access is gained by using CMTS channels, comprising:

(a) reception means for locating during standby operation available channels for accessing either said CMTS or said MCS;

(b) memory means for storing information identifying a last accessed channel;

(c) control means for accessing during said standby operation a last accessed CMTS or MCS on said last-accessed channel, if available, and for accessing said last-accessed CMTS or MCS on another available channel allotted thereto that is located by said reception means if said last-accessed channel is not available, said control means accessing the other of said CMTS or MCS on an available channel allotted thereto that is located by said reception means if no available channels are located to access said last-accessed CMTS or MCS.

5. The portable radio telephone of claim 1 wherein said control means registers positional information for said portable radio telephone with said accessed CMTS or MCS during said standby operation.

6. A method by which a portable radio telephone, during standby operation, either accesses a cellular mobile telephone system (CMTS) to which access is gained by using one of a plurality of CMTS control channels allotted thereto or accesses a microcellular system (MCS) which operates in the same frequency band and within an operating area of said CMTS to which access is gained by using CMTS channels, comprising the steps of:

(a) storing at said portable radio telephone information related to a last-accessed channel;

(b) locating available channels for accessing said CMTS or MCS by scanning said CMTS frequency band;

(c) accessing either said CMTS or MCS that was last accessed on said last-accessed channel, if available;

(d) accessing said last-accessed CMTS or MCS on another available channel allotted thereto if said last-accessed channel is not available; and (e) accessing the other of said CMTS or MCS on an available channel allotted thereto if no channels are available to access said last-accessed CMTS or MCS.

7. The method of claim 6, comprising the further step of registering positional information for said portable radio telephone with said accessed CMTS or MCS during said standby operation.

* * * * *